(12) United States Patent
Howes et al.

(10) Patent No.: US 7,585,140 B1
(45) Date of Patent: Sep. 8, 2009

(54) VEHICLE AND CARGO TRANSPORT RATCHETING TIE DOWN APPARATUS AND SYSTEM

(75) Inventors: Philip Bryan Howes, Braselton, GA (US); Neil H. M. Robertson, Lawrenceville, GA (US); David Trenbeath, Buford, GA (US)

(73) Assignee: Cottrell, Inc., Gainesville, GA (US)

( * ) Notice: Subject to any disclaimer, the term of this patent is extended or adjusted under 35 U.S.C. 154(b) by 0 days.

(21) Appl. No.: 12/056,594

(22) Filed: Mar. 27, 2008

(51) Int. Cl.
*B60P 7/08* (2006.01)
(52) U.S. Cl. .......................... 410/103; 410/12
(58) Field of Classification Search ............ 410/7, 410/9–12, 19, 21–23, 97, 100, 103; 254/217, 254/223, 243, 247, 245, 330, 241, 345, 346, 254/352, 355, 356, 357, 365, 369, 376; 248/499
See application file for complete search history.

(56) References Cited

U.S. PATENT DOCUMENTS

| 4,382,736 | A | * | 5/1983 | Thomas | ........................ 410/104 |
| 5,101,537 | A | | 4/1992 | Cummings | |
| 2006/0013667 | A1 | | 1/2006 | Ruan | |

* cited by examiner

*Primary Examiner*—Stephen Gordon
(74) *Attorney, Agent, or Firm*—Cantor Colburn LLP

(57) ABSTRACT

A ratcheting tie down apparatus and system. Exemplary embodiments include a ratcheting tie down system, including a ratchet assembly affixed to an end of a tie down shaft having a longitudinal axis, a pawl mechanism coupled to the ratchet assembly, wherein the ratchet assembly includes a ratchet gear, a ratchet head coupled to the ratchet gear, wherein an inner face of the ratchet gear is positioned in opposition to and in mechanical contact with an inner face of the ratchet head, and wherein the ratchet gear, the ratchet head and the shaft are configured to rotate as a single integral unit when rotated in a forward direction about the longitudinal axis, and the ratchet head is configured to rotate with respect to the ratchet gear and the shaft when the ratchet head is rotated in a reverse direction about the longitudinal axis.

8 Claims, 11 Drawing Sheets

VEHICLE AND CARGO TRANSPORT RATCHETING TIE DOWN APPARATUS AND SYSTEM

BACKGROUND

The present invention relates generally to automobile and cargo transport, and more particularly, to a ratcheting tie down apparatus and system.

FIG. 1 illustrates a prior art vehicle transport trailer 100. Several vehicles 105 can be transported on the trailer. Each of the vehicles typically has its own platform 110 onto which each vehicle 105 is secured.

FIG. 2 illustrates a side view of a prior art vehicle trailer tie down system 101. As previously described, each vehicle 105 is secured to its platform 110. FIG. 2 illustrates the vehicle 105 tied to its platform 110 by straps 115 arranged around each wheel 106 of the vehicle 105. The vehicle 105 is typically restrained to the platform 100, and therefore the trailer, by arranging the straps 115 to the wheels 106 of the vehicle 105 and the platform 110 or other part of the trailer. The straps 115 are placed in tension to prevent movement.

FIG. 3 illustrates a top perspective view of the prior art vehicle trailer tie down system 101 of FIG. 2. Currently, locking mechanisms 120 are implemented to keep the straps 115 from loosening due to forces acting upon the vehicle 105 (e.g. gravity, centripetal and other forces asserted on the vehicle 105 from the trailer or otherwise). There are many types of mechanisms 120 such as ratchet and clamping devices that are typically manually tightened. For example, one end of the strap 115 can be connected to a fixed hook 125 that can be fixed to multiple slots 130 on the platform 110. The strap 115 can then be routed through an intermediate hook 135 also placed in one of the multiple slots 130 on the platform 110. The strap 115 can then be connected to a shaft 140 of the mechanism 120. Current ratchet 145 and pawl 150 mechanisms are implemented to tighten the strap 115 around the shall. The overall tie down system can include a gear casting 146 with ramping surfaces 147 engaged with a pawl 150. The ramping surfaces allow gear rotation in one direction, but stop rotation in the other direction due to engagement with the pawl 150. The shaft 140 is affixed to the gear casting 146. Currently, the shaft 140 can be equipped with either a chain attachment mechanism, or a strap attachment mechanism. Integral to the gear casting 146 is a protrusion 148 with a series of cross-holes 149 that are perpendicular to the rotational axis of the gear casting 146.

In operation, a tie down bar 170 is inserted into these cross-holes and force is applied to the tie down bar 170, which creates a torque about the shaft 140. The torque is transmitted into tension in the chain or strap that is attached to the shaft 140. Typically, the tie down 170 bar can be rotated about 60 degrees at a time. If this rotation does not take up sufficient slack in the chain or strap, then the tie down bar 170 is pulled out of the current cross-hole 149, reinserted into the next convenient cross hole 149, and rotated again. This action may be repeated many times.

BRIEF SUMMARY

Exemplary embodiments include a ratcheting tie down system for a vehicle transporter having one or more vehicle platforms, the system including a ratchet assembly affixed to an end of a tie down shaft having a longitudinal axis, the tie down shaft being affixed to one of the one or more vehicle platforms, a pawl mechanism coupled to the ratchet assembly, wherein the ratchet assembly includes a ratchet gear; a ratchet head coupled to the ratchet gear, wherein an inner face of the ratchet gear is positioned in opposition to and in mechanical contact with an inner face of the ratchet head, and wherein the ratchet gear, the ratchet head and the shaft are configured to rotate as a single integral unit when rotated in a forward direction about the longitudinal axis, and the ratchet head is configured to rotate with respect to the ratchet gear and the shaft when the ratchet head is rotated in a reverse direction about the longitudinal axis, the ratchet gear and the ratchet head remaining in mechanical contact during both the forward direction and reverse direction.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include a ratcheting tie down apparatus and system for a vehicle or cargo transporter, which allows an operator to insert the tie down bar once and tighten to the desired tension without continually reinserting the tie down bar. The conventional ratchet 145 is replaced by a dual component configuration including a ratchet gear and a ratchet head with the cross holes for inserting a tie down bar.

Figure 1:
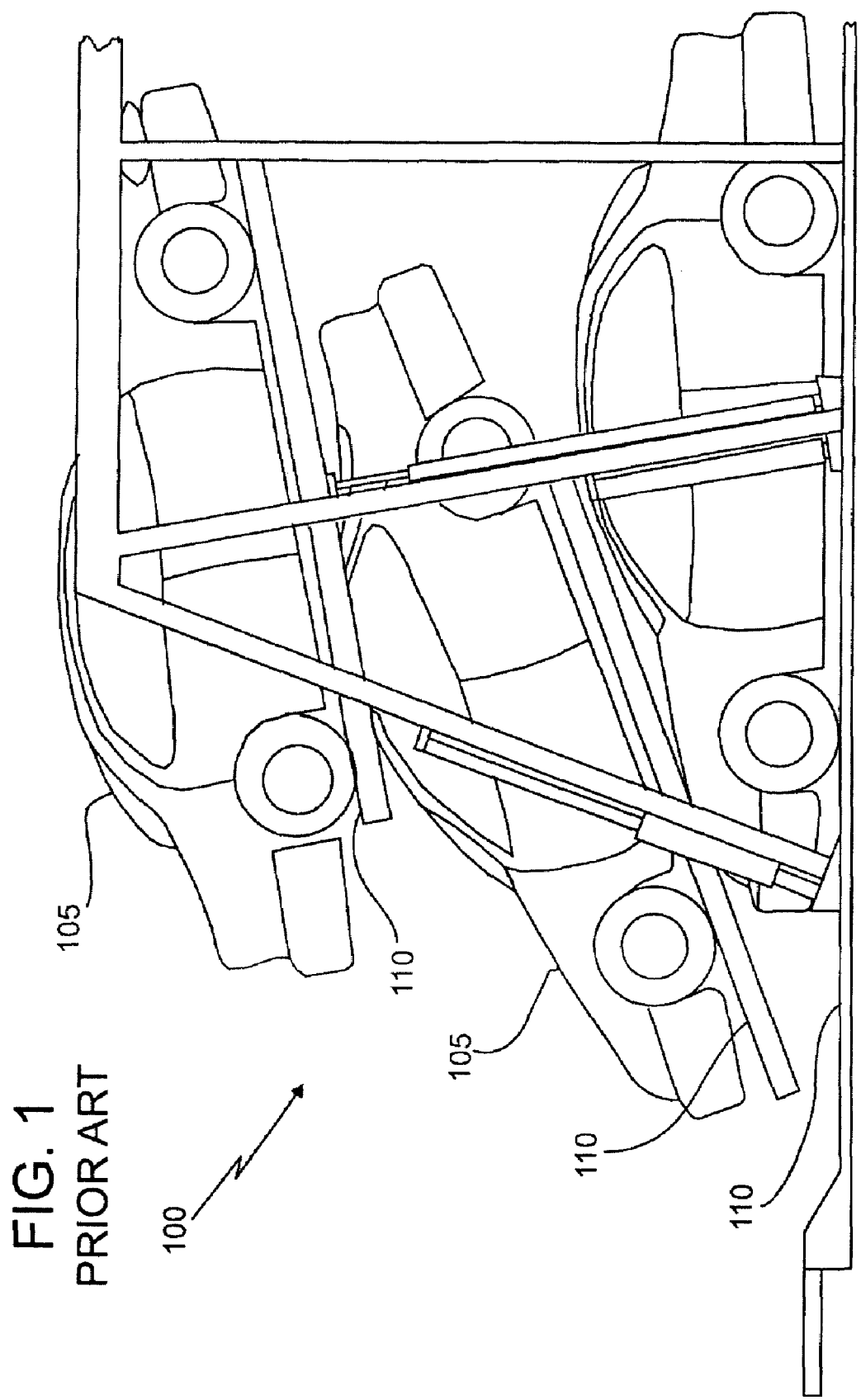
FIG. 1 illustrates a prior art vehicle transport trailer.
Figure 2:
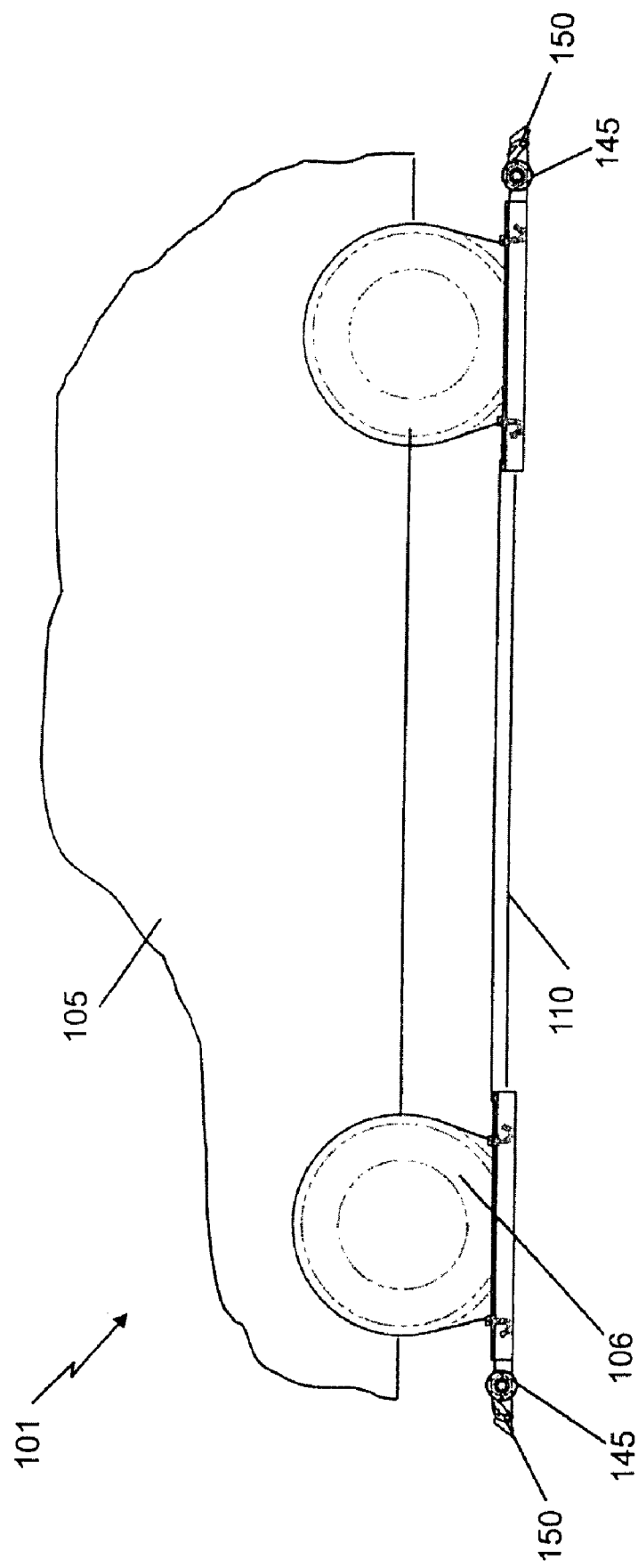
FIG. 2 illustrates a side view of a prior art vehicle trailer tie down system 101. As previously described, each vehicle is secured to its platform.
Figure 3:
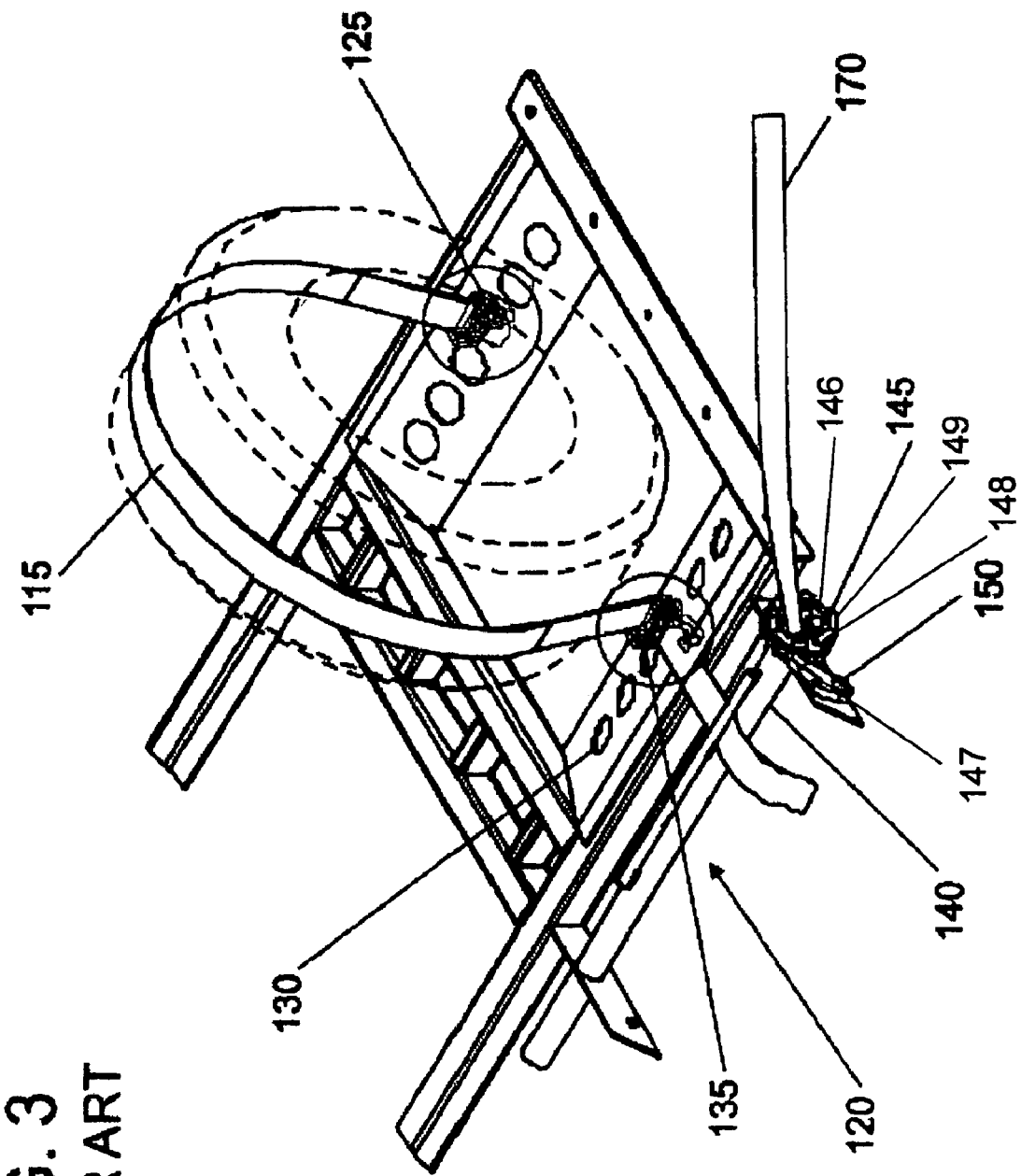
FIG. 3 illustrates a top perspective view of the prior art vehicle trailer tie down system of FIG. 2.
Figure 4:
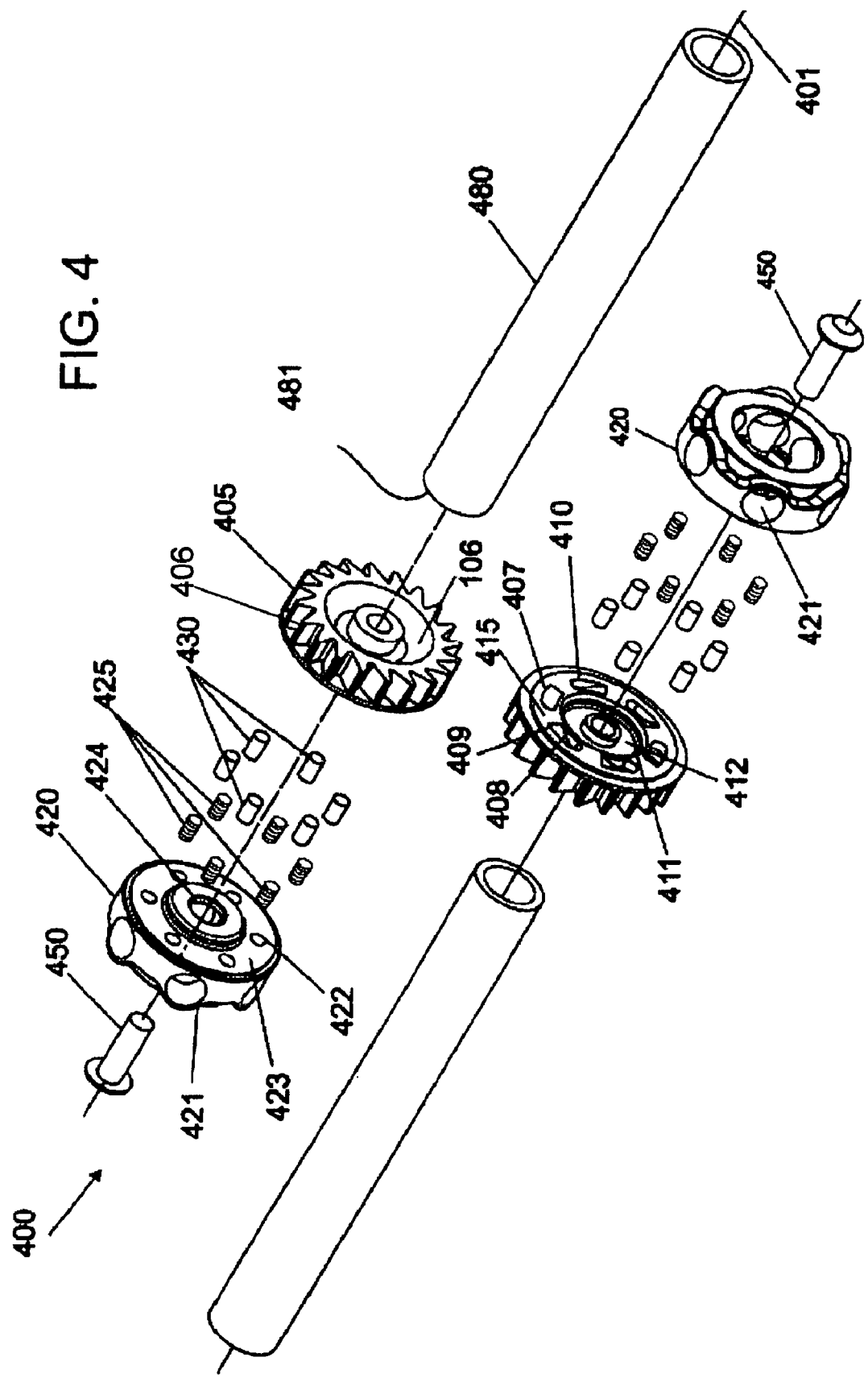
FIG. 4 illustrates an exploded perspective view of a ratcheting tie down apparatus in accordance with exemplary embodiments.

FIG. 4 illustrates an exploded perspective view of a ratcheting tie down apparatus 400 in accordance with exemplary embodiments. As described above, the apparatus 400 can be affixed to a platform of a vehicle transporter. In exemplary embodiments, the apparatus 400 includes a ratchet gear 405 having engagement teeth 406 configured to engage with a pawl mechanism as described herein. The ratchet gear 405 can further include a series of ramped pockets 407 positioned along an inner face 415 of the ratchet gear 405. The ramped pockets 407 each generally include a ramp surface 408 positioned between an upper-most portion 409 of each ramped pocket 407, which is adjacent and co-planar with the inner face 415, and a lower-most portion 410 positioned at a depth within the ratchet gear 405, thereby defining a wall 411 within each of the ramped pocket 407.

The apparatus 400 further includes a ratchet head 420 having a series of cross-holes 421 that are perpendicular to a rotational axis 401 of and generally positioned around a circumference of the ratchet head 420. The ratchet head 420 can further include a series of depressions 422 positioned along an inner face 423 of the ratchet head 420. The depressions 422 are a fixed radial distance away from the rotational axis 401. It is further appreciated that the ramped pockets 407 are also a fixed radial distance away from the rotational axis 401. In exemplary embodiments, the series of depressions 422 are cylindrical holes into which resilient bodies 425 (e.g., compression springs) are positioned. In exemplary embodiments, drive bodies 430 (e.g., cylindrical drive pins) are further positioned in the series of depressions 422, generally adjacent or on top of the resilient bodies 425. In exemplary embodiments, the resilient bodies 425 and the drive bodies 430 are parallel to the longitudinal axis 401.

In exemplary embodiments, the drive bodies 430 are further configured to be positioned in the ramped pockets 407 on the inner face 415 of the ratchet gear 405 when the ratchet gear 405 and the ratchet head 420 are assembled as now described. The ratchet gear 405 can include a first mating pair 412 which can be male or female. Similarly, the ratchet head 420 can include a second mating pair 424, which can be either male or female. The ratchet gear 405 and the ratchet head 420 can mate via the first and second mating pairs 412, 424. The ratchet gear 405 and the ratchet head 420 are affixed to one another via a retaining pin 450 or other similar device, to restrict the relative movement of the ratchet gear 405 and the ratchet head 420 to rotational movement about the axis 401 and with respect to one another. The assembled ratchet gear 405 and ratchet head 420 can then be affixed to an end 481 of a shaft 480. In exemplary embodiments, the ratchet gear 405 is fixed to the end 481 of the shaft (e.g., via welding) such that the shaft 480 and the ratchet gear 405 can rotate as a single integral unit. Furthermore, as described herein, the ratchet head 420 is configured to rotate as a single unit with the ratchet gear 405 and the shaft 480 when rotating in a forward direction to provide tightening of a chain and/or strap. The ratchet head 420 is further configured to rotate independently with respect to the ratchet gear 405 and shaft 480 when rotated in a reverse direction during a ratcheting or "free wheeling" motion as further described herein. The shaft 480 can be any shaft implemented to tie clown a load, such as an automobile and equipped with either a chain attachment mechanism, or a strap attachment mechanism as described herein.

In exemplary embodiments, once of the ratchet gear 405 and the ratchet head 420 are assembled, the series of drive bodies 430 are constrained and spring-loaded via the resilient bodies 425. It is appreciated that the lengths of the resilient bodies 425 and the drive bodies 430 can vary in order to vary the compression of the drive bodies 430 within the depressions 422 and the ramped pockets 407. Furthermore, the motion of the drive bodies 430 is limited to an inward and outward motion into and out of the depressions 422 as the resilient bodies 425 are compressed.

In exemplary embodiments, when the resilient bodies 425 are in a least compressed state, the drive bodies 430 are fully inserted into the lower most portions 410 of the ramped pockets 407. In this state, a tie down bar as described herein is inserted into these cross-holes 421. When a force is applied to the tie-down bar and a torque is applied to the shaft 480, there is no relative motion of the assembled ratchet gear 405 and ratchet head 420 because the drive bodies 430, fixed into the lower most portion 410 of the ramped pockets 407 press laterally against each respective wall 411 within each of the ramped pockets 407. Those skilled in the art appreciate that the respective pawl mechanism engages the engagement teeth 406 during the "forward" rotation. If the rotation does not take up sufficient slack in the chain or strap, then the tie down bar remains in the same cross-hole 421 and the operator simply rotates the opposite rotational direction to the direction implemented to apply the torque as described. The opposite rotational direction results in relative rotational movement, or "free wheeling" of the assembled ratchet gear 405 and ratchet head 420. During the free wheeling movement, the drive bodies 430 ride along the ramp surface 408 of each ramped pocket 407 from the lower-most portions 410 to the upper most portions 409. Once the drive bodies 430 ride to the upper most portions 409, the drive bodies 430 are then positioned on the inner face 415 between adjacent ramped pockets 407. Continued opposite rotation then causes the drive bodies 430 to enter into the lower-most portions 410 of the next ramped pocket 407. When the drive bodies 430 enter into the lower-most portions 410 of the next ramped pocket 407, the drive bodies 430 expand out of the depressions 422 via the resilient force of the resilient bodies 425. It is appreciated that the movement of the drive bodies 430 can ride through several ramped pockets 407 as described in a ratcheting manner. The compression of the resilient bodies 425 and the subsequent movement of the driving bodies 430 associated with the compression is in a direction perpendicular to the inner faces 415, 423 of the ratchet gear 405 and ratchet head 420, respectively and parallel to the longitudinal axis 401. When the operator is ready to rotate the assembled ratchet gear 405 and ratchet head 420 in the forward direction again to further tighten the chain and/or strap, the operator simply reapplied the force as described herein resulting in the rotation of the assembled ratchet gear 405 and ratchet head 420 with no relative motion between them as described. This process can be repeated as necessary.

It is thus appreciated that rotation of the ratchet gear 405 and the ratchet head 420 in the forward direction forces the spring loaded drive bodies 430 to ramp out and then reengage the ramped pockets 407. This configuration results in a "free wheeling" condition between the ratchet gear 405 and the ratchet head 420. Rotation of the ratchet gear 405 and the ratchet head 420 in the opposite direction forces the spring-loaded drive bodies 430 into the lower-most portion 410 and against and in mechanical contact with the wall 411 of the ramped pockets 407, resulting in a lock up condition between the ratchet gear 405 and the ratchet head 420.

Figure 5A:
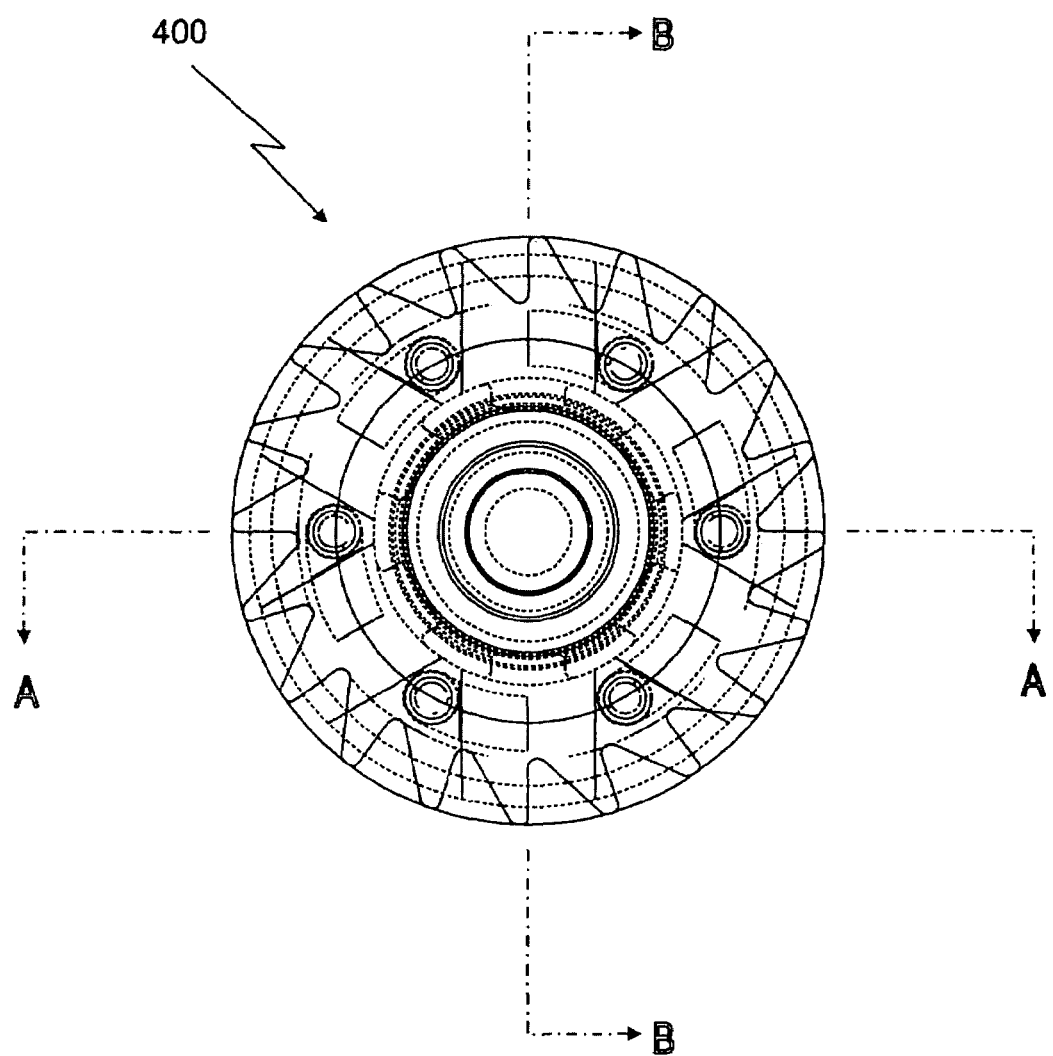
FIGS. 5A, 5B and 5C illustrate a top plan view, a side view and a cross-sectional side view of a ratcheting tie down apparatus in accordance with exemplary embodiments.
Figure 5B:
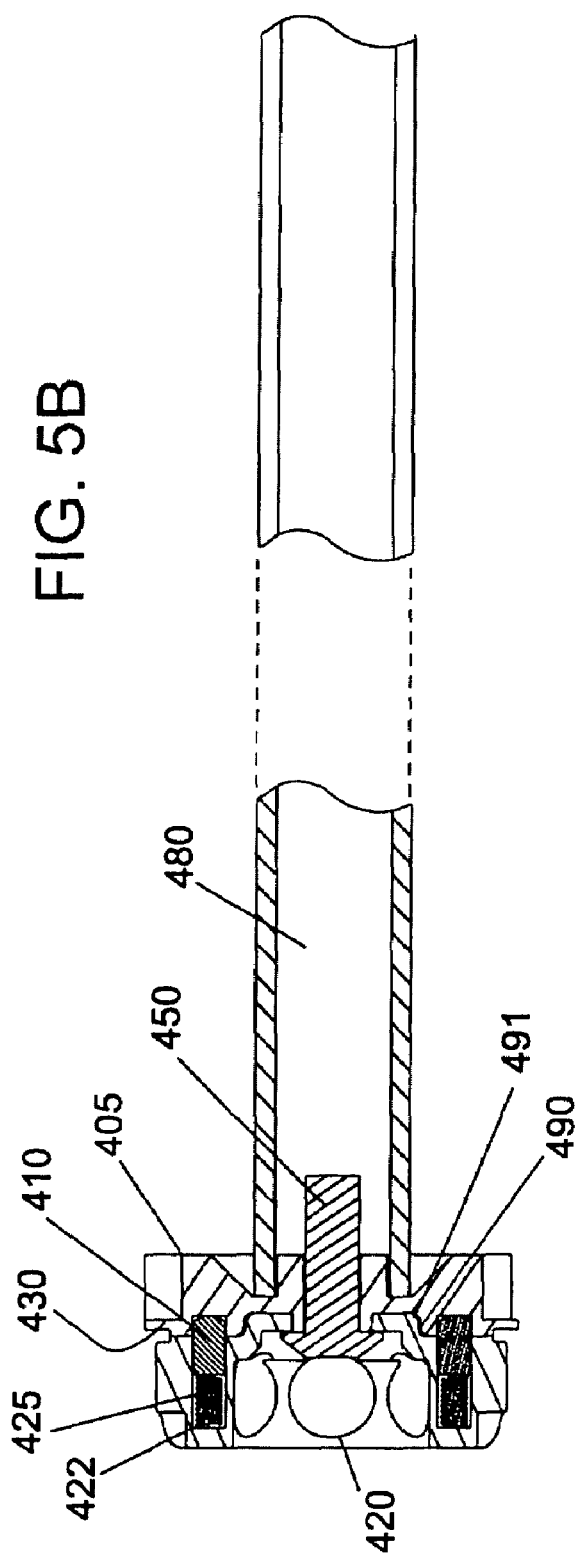
Figure 5C:
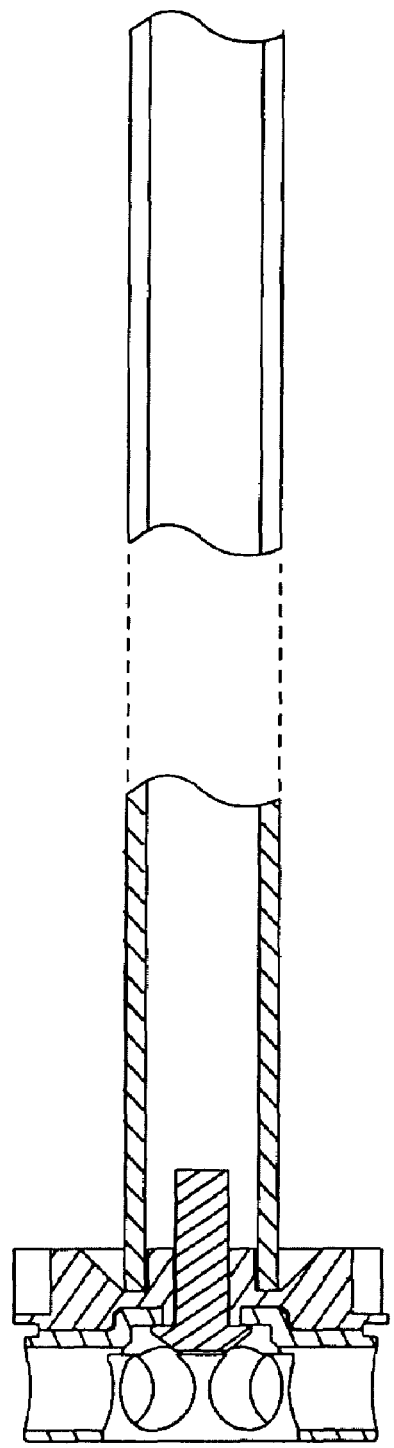

FIG. 5 illustrates a top plan view and a cross-sectional side view of a ratcheting tie down apparatus 400 in accordance with exemplary embodiments. The side view illustrates the assembled ratchet gear 405 and ratchet head 420. As described and as illustrated in view 'A'-'A', the drive bodies 430 are positioned in the lower-most portion 410 of the ramped pockets 407 and the resilient devices 425 are compressed within the depressions 422. The mating pairs 412, 424 between the ratchet gear 405 and ratchet head 420 form an outer groove 490, into which a seal 491 can be installed to limit intrusion of water and contaminates.

Figure 6:
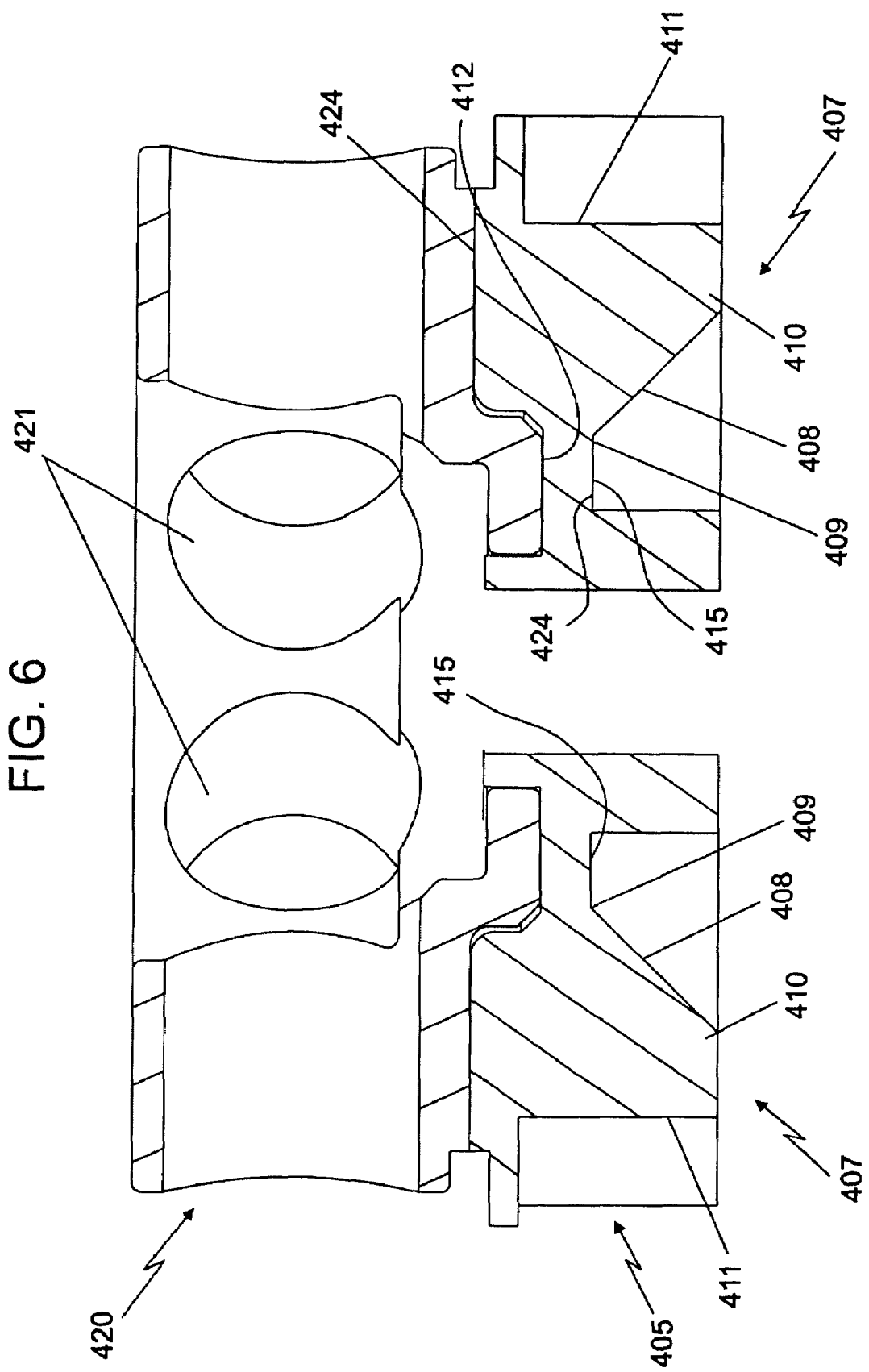
FIG. 6 illustrates an exemplary assembled ratchet gear and ratchet head.
Figure 7A:
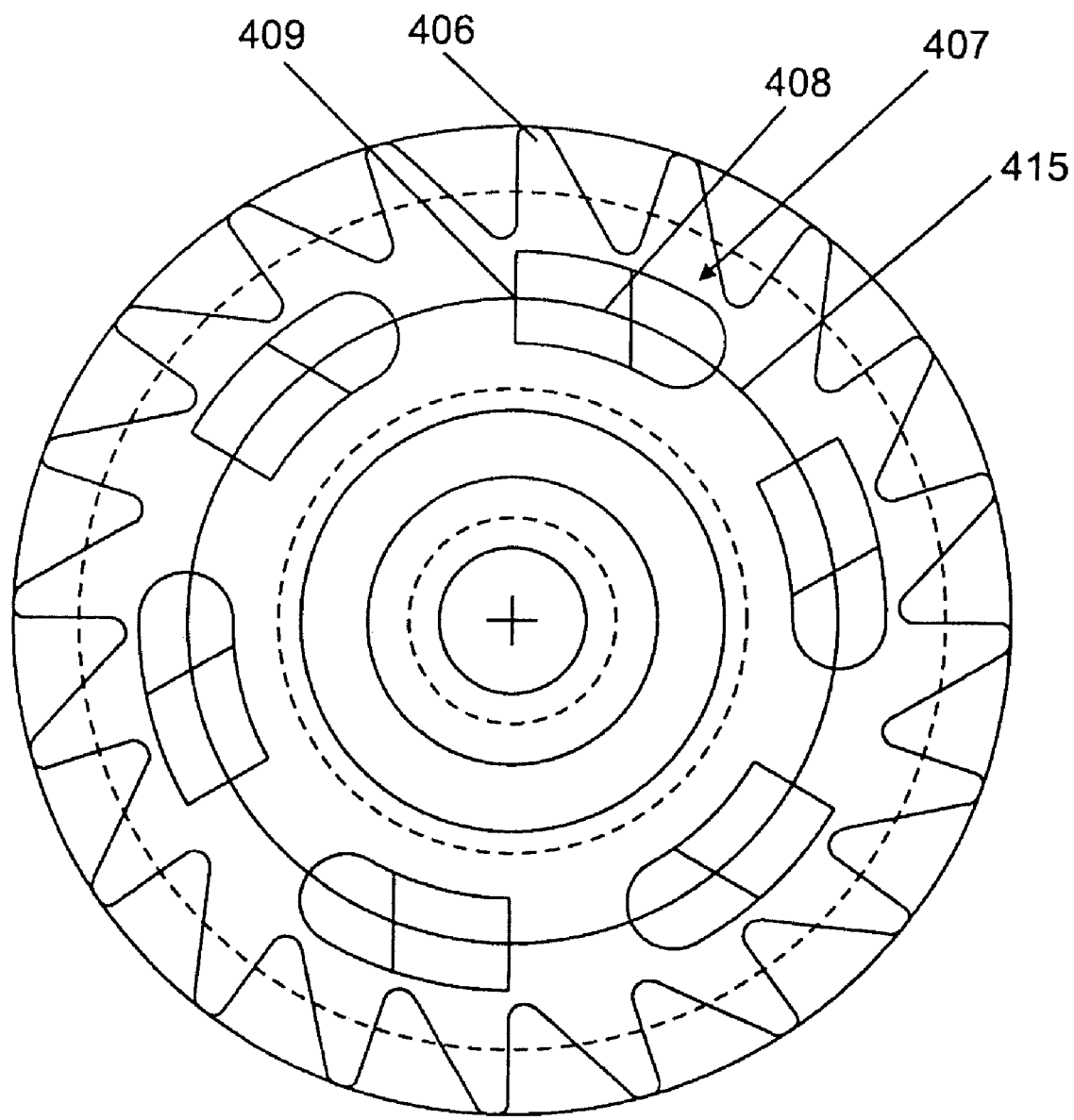
FIGS. 7A, 7B and 7C illustrate top plan view and side views of a ratchet gear in accordance with exemplary embodiments.
Figure 7B:
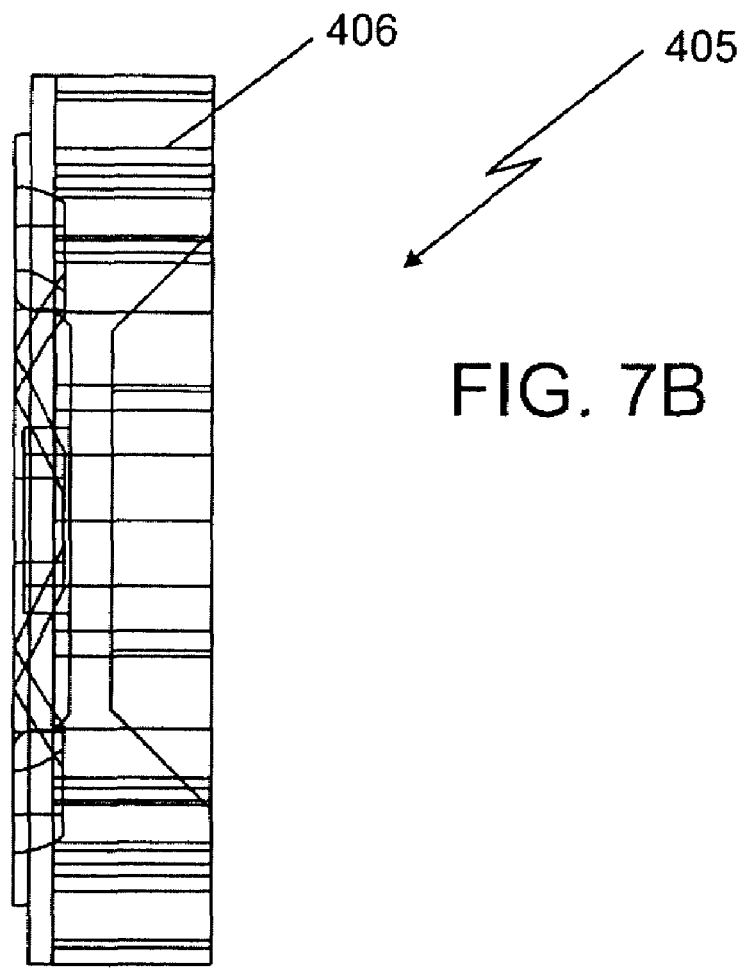
Figure 7C:
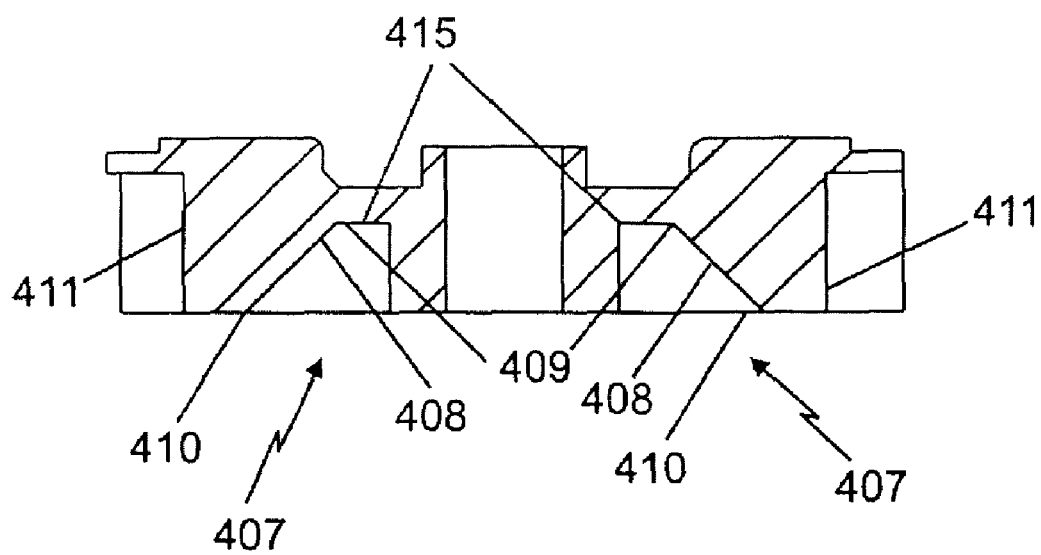
Figure 8A:
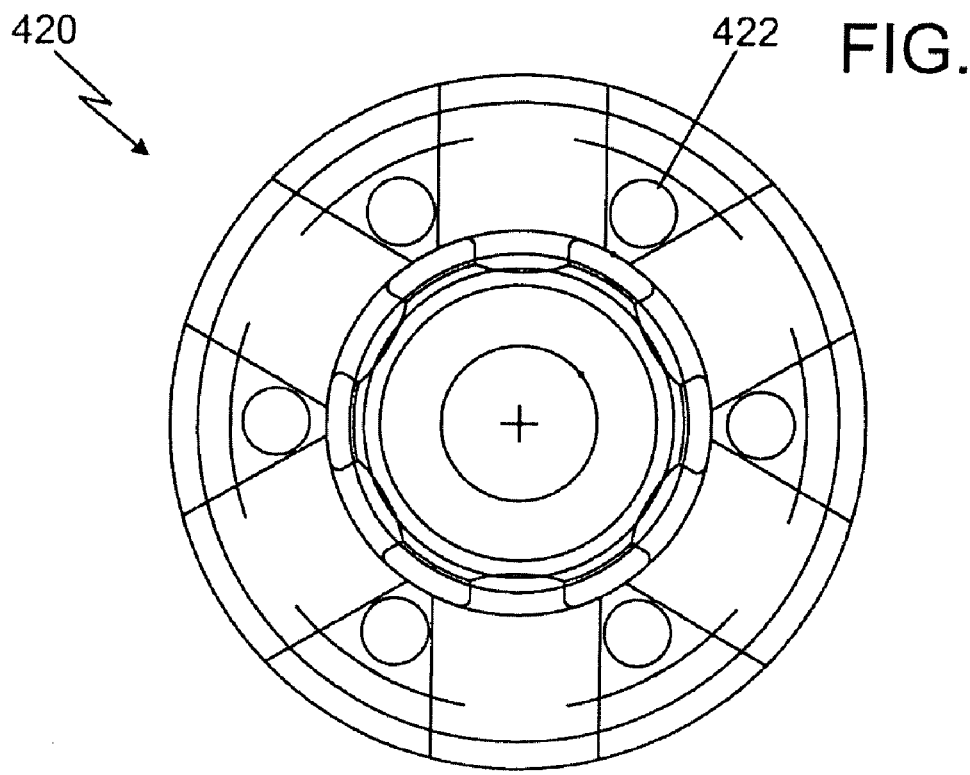
FIGS. 8A, 8B, 8C and 8D illustrate top plan view, a perspective view and side views of a ratchet head in accordance with exemplary embodiments.
Figure 8B:
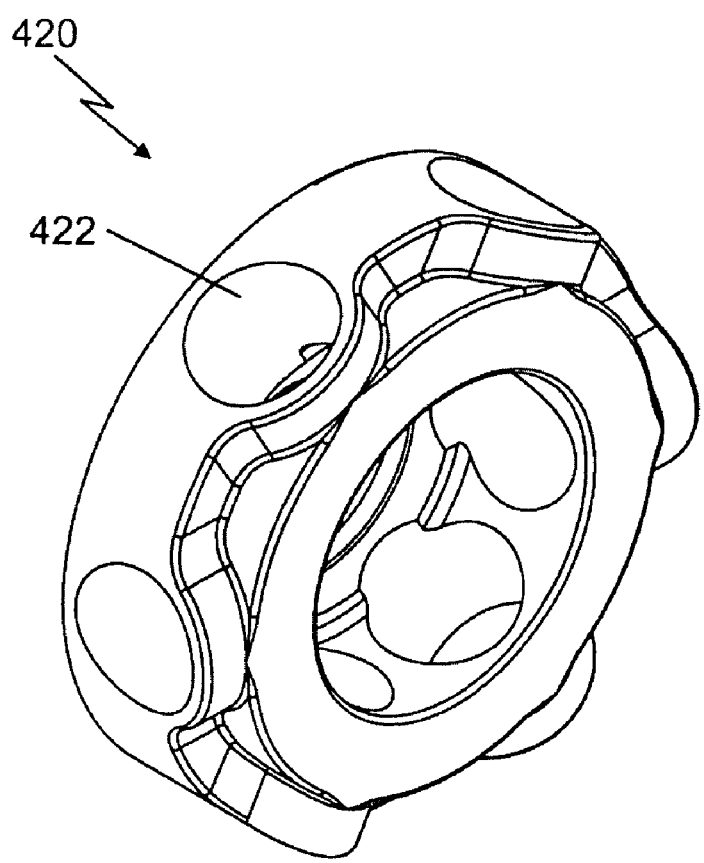
Figure 8C:
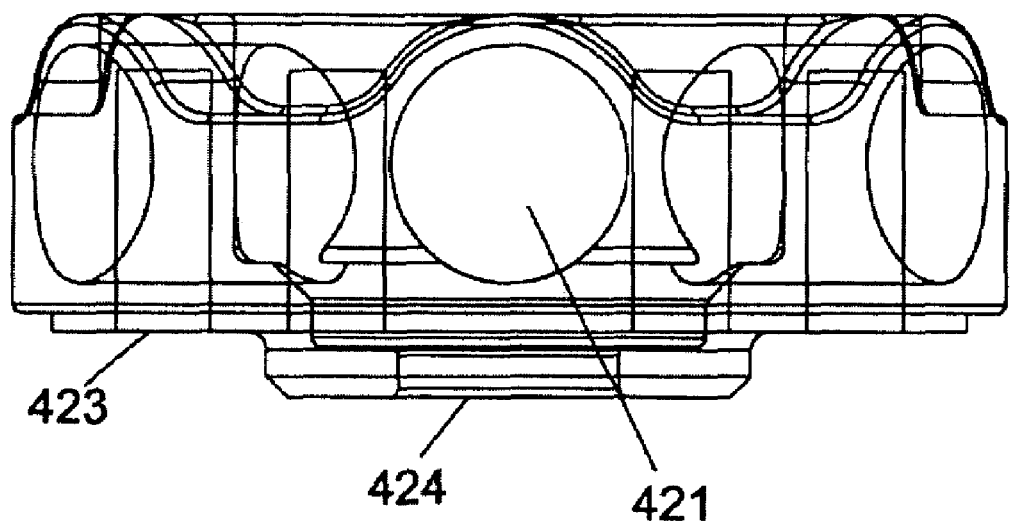
Figure 8D:
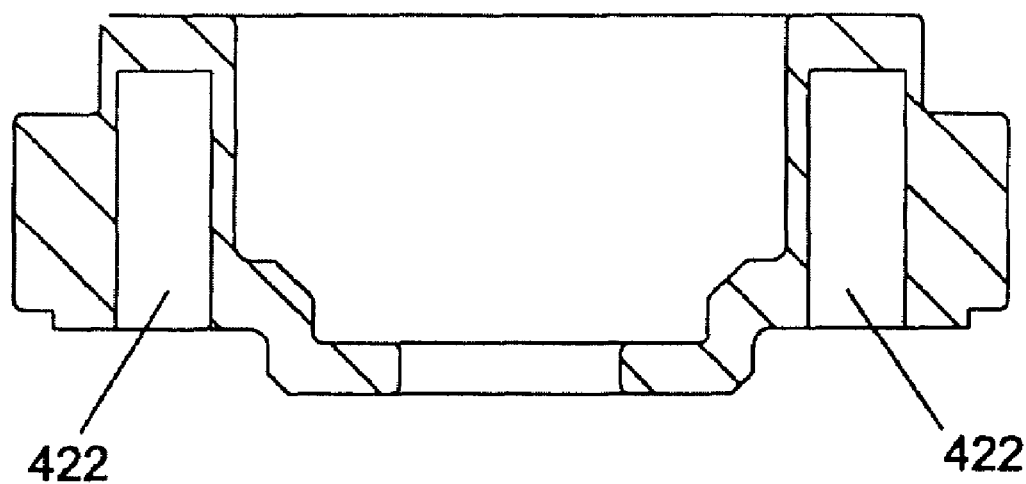

FIG. 6 illustrates an exemplary assembled ratchet gear 405 and ratchet head 420. FIG. 7 illustrates top plan and side views of a ratchet gear 405 in accordance with exemplary embodiments. FIG. 8 illustrates op plan and side views of a ratchet head 420 in accordance with exemplary embodiments. For illustrative purposes other components as described herein are removed from the figure. As described herein, the ratchet gear 405 includes the ramped pockets 407, each having the ramp surface 408, the upper-most portion 409, the lower-most portion 410, and the wall 411. The ratchet gear 405 further includes, the engagement teeth 406, the inner face 415 and the mating pair 412 as described herein. As further described herein, the ratchet head 420 includes the cross-holes 421, the depressions 422, the inner face 423, and the mating pair 424.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A ratcheting tie down system for a vehicle transporter having one or more vehicle platforms, the system comprising:
   a ratchet assembly affixed to an end of a tie down shaft having a longitudinal axis, the tie down shaft being affixed to one of the one or more vehicle platforms;
   a pawl mechanism coupled to the ratchet assembly,
   wherein the ratchet assembly comprises:
      a ratchet gear having engagement teeth coupled to the pawl mechanism;
      a ratchet head coupled to the ratchet gear,
      wherein an inner face of the ratchet gear is positioned in opposition to and in mechanical contact with an inner face of the ratchet head, and
      wherein the ratchet gear, the ratchet head and the shaft are configured to rotate as a single integral unit when rotated in a forward direction about the longitudinal axis, and the ratchet head is configured to rotate with respect to the ratchet gear and the shaft when the ratchet head is rotated in a reverse direction about the longitudinal axis.

2. The system as claimed in claim 1 further comprising drive bodies disposed in depressions positioned on the inner face of the ratchet head.

3. The system as claimed in claim 2 further comprising ramped pockets disposed on the inner face of the ratchet gear.

4. The system as claimed in claim 3 wherein the drive bodies are configured to compress into and expand out of the depressions positioned on the inner face of the ratchet head.

5. The system as claimed in claim 3 wherein the ramped pockets each comprise:
   a ramp surface positioned between an upper-most portion of each ramped pocket, said uppermost portion being adjacent and co-planar with the inner face of the ratchet gear; and
   a lower-most portion positioned at a depth within the ratchet gear, thereby defining a wall within each of the ramped pockets.

6. The system as claimed in claim 5 wherein the drive bodies are configured to ride along the ramp surface and into an adjacent ramped pocket in response to a reverse rotation of the ratchet head.

7. The system as claimed in claim 5 wherein the drive bodies are configured to position in the lower-most portion and be in mechanical contact with the wall in response to a forward rotation of the ratchet head, the ratchet gear and the tie-down shaft.

8. The system as claimed in claim 1 wherein the shaft is configured to receive at least one of a chain and a strap.

* * * * *